June 19, 1928.

W. B. WOLFF

SLICING MACHINE

Filed May 21, 1926    2 Sheets-Sheet 1

1,674,385

Inventor
Wallace B. Wolff
By Parker & Carter
Attorneys.

June 19, 1928.
W. B. WOLFF
SLICING MACHINE
Filed May 21, 1926
1,674,385
2 Sheets-Sheet 2
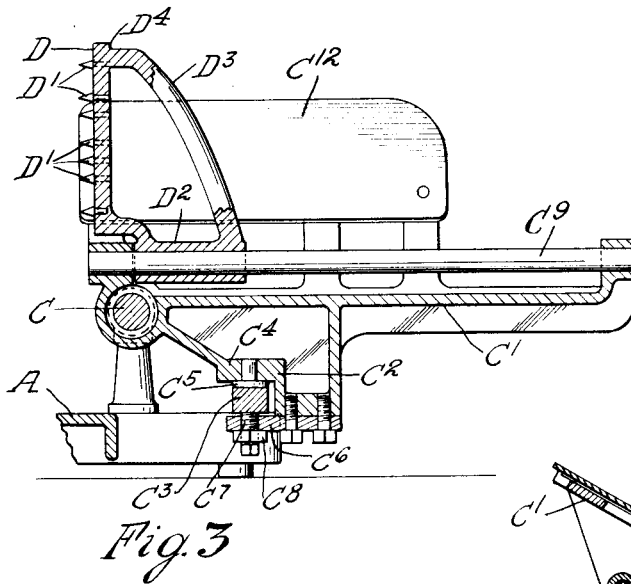
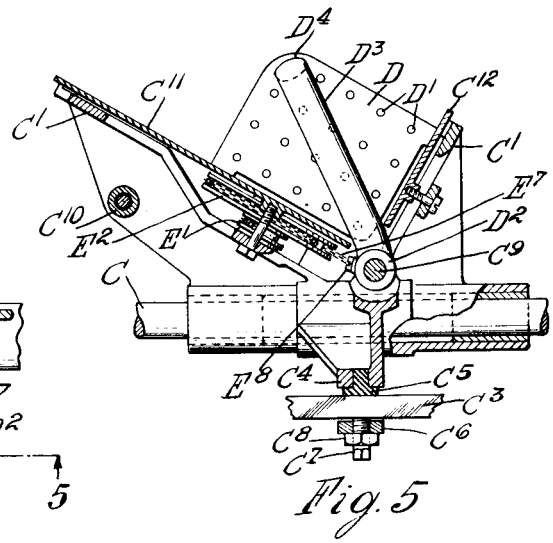
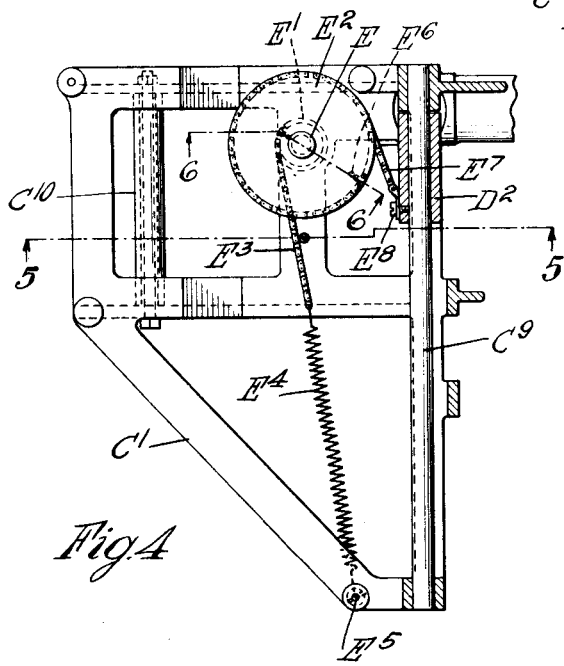
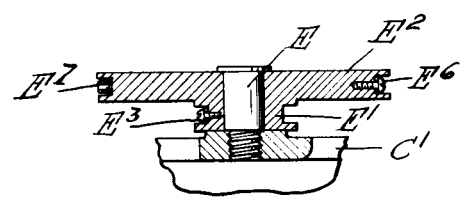
Inventor
Wallace B. Wolff
by Parker & Carter
Attorneys Patented June 19, 1928.

1,674,385

UNITED STATES PATENT OFFICE.

WALLACE B. WOLFF, OF CHICAGO, ILLINOIS, ASSIGNOR TO AMERICAN SLICING MACHINE COMPANY, OF CHICAGO, ILLINOIS, A CORPORATION OF NEW YORK.

SLICING MACHINE.

Application filed May 21, 1926. Serial No. 110,622.

My invention relates to an improvement in slicing machines and particularly of a yieldingly actuated meat end plate or pusher plate for use with a slicing machine having a rotary knife and a meat supporting carriage adapted to be moved across such knife. One object is the provision of means for maintaining a generally even thrust of feed plate and meat toward the knife. Another object is the provision of means for compensating for the differences in position of the meat plate in relation to the pressure or tension of the yielding actuating means. Other objects will appear from time to time in the course of the specification and claims.

I illustrate my invention more or less diagrammatically in the accompanying drawings, wherein—

Figure 1:
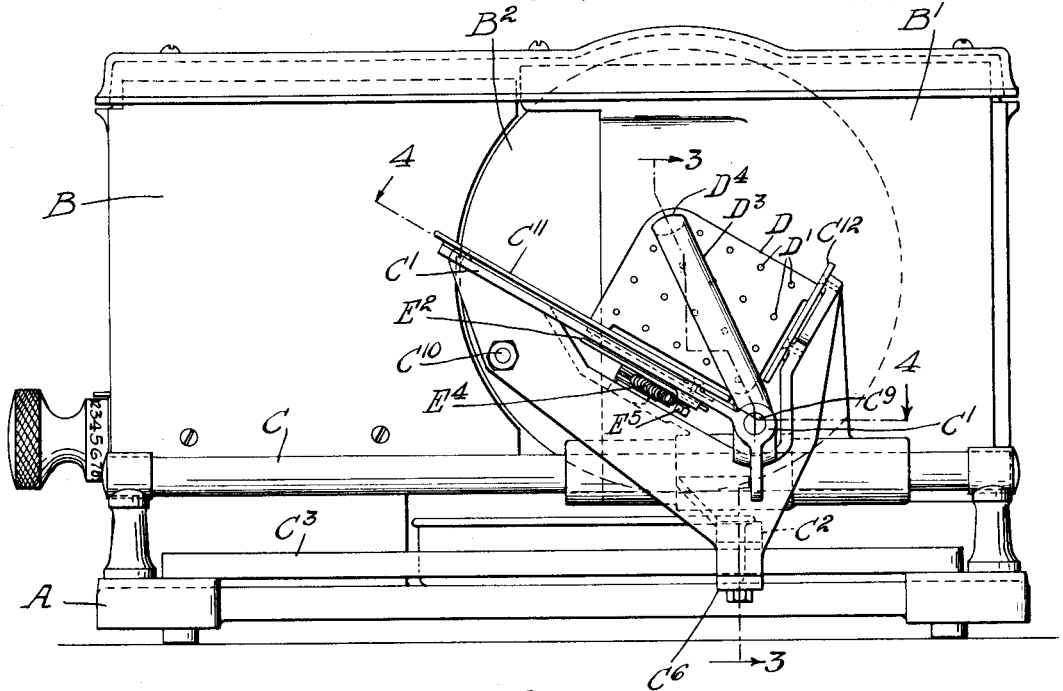
Figure 2:
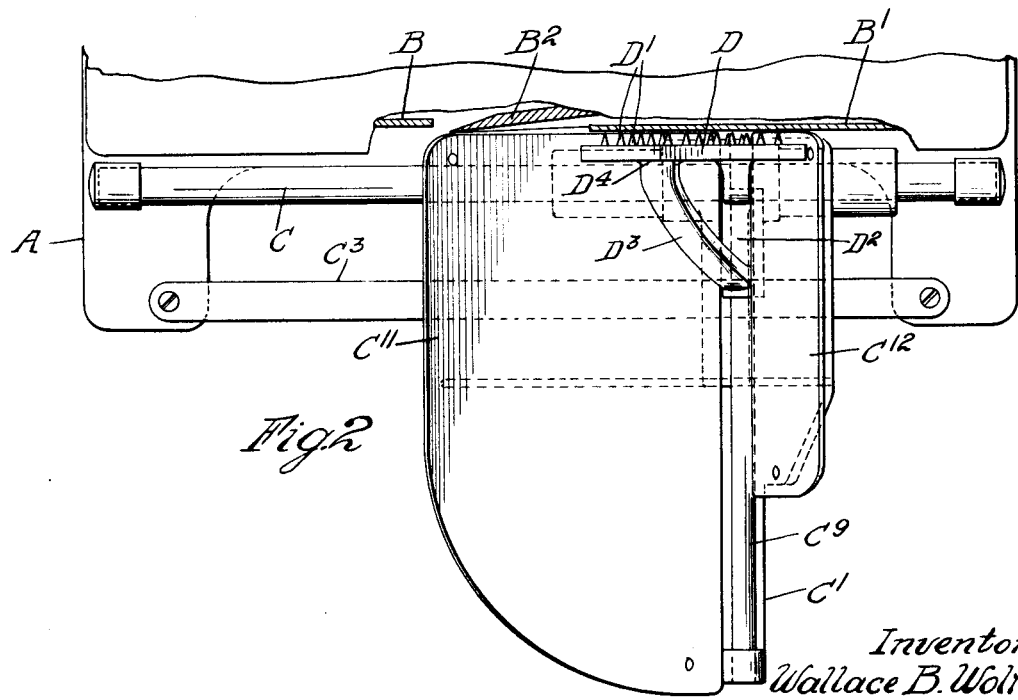

Figure 1 is a side elevation;
Figure 2 is a partial plan view;
Figure 3 is a section on the line 3—3 of Figure 1;
Figure 4 is a section on the line 4—4 of Figure 1;
Figure 5 is a section on the line 5—5 of Figure 4; and
Figure 6 is a section on the line 6—6 of Figure 4.

Like parts are indicated by like symbols throughout the specification and claims.

A indicates any suitable base member for a slicing machine supporting thereon any suitable frame structure upon which is mounted the gauge plate B, the guard plate $B^1$ and the rotary knife $B^2$. These are not illustrated in detail and it will be understood that the showing is purely diagrammatic and that the particular knife gauge plate, guard plate and frame structure do not form part of the present invention and that my meat end or feed plate and means for actuating it may be used with a wide variety of slicing mechanisms.

C indicates a track herein shown as in circular cross section upon which is slidably mounted the reciprocating meat support generally indicated at $C^1$. A downwardly depending portion thereof generally indicated as $C^2$ engages the guide track $C^3$ for example by the bracket member $C^4$ with the fiber bearing stud $C^5$ and the underlying member $C^6$ with the adjusting bolt $C^7$ and its lock nut $C^8$. $C^9$ is a guide rod mounted upon the meat support $C^1$ and $C^{11}$ $C^{12}$ are meat supporting plate members of extended area. Mounted on the frame $C^1$ is any suitable handle member $C^{10}$ whereby the carriage may be moved along the tracks C and $C^3$.

Mounted to slide along the rod $C^9$ is the meat and plate structure proper which consists of a forward plate D having pins or teeth $D^1$ thereupon, a sleeve $D^2$ surrounding and slidable upon the rod $C^9$ and a reinforcing and handle member $D^3$ extending from the upper corner $D^4$ of the plate D to the inner end of the sleeve $D^2$.

Mounted upon the frame $C^1$ is the pulley shaft or stud E about which rotates a double pulley member including the small pulley $E^1$ and the large pulley $E^2$, the two pulleys being integral or held against relative rotation. Fastened to the smaller pulley $E^1$ and passing thereabout is a chain or flexible member $E^3$ the outer end of which is secured to a tension member, herein shown as the spiral spring $E^4$ the outer end of which is secured as at $E^5$ to the outer end of the frame $C^1$. Secured as at $E^6$ to the periphery of the larger pulley $E^2$ is the chain member $E^7$ which passes thereabout and is secured at its opposite end as at $E^8$ to the sleeve $D^2$ of the meat and plate D.

It will be realized that whereas I have described and shown an operative device that nevertheless many changes might be made in the size, shape, number and disposition of parts without departing from the spirit of my invention and I wish therefore that my showing be taken as in a sense diagrammatic rather than as limiting me to my specific showing.

The use and operation of my invention are as follows:

I have developed a meat end plate or pusher plate adaptable for use with the general class of slicing machines wherein a rotary knife has associated with it a meat carriage which may be moved back and forth across the face of the knife, whereby material positioned upon the carriage may be sliced by the action of the knife. The particular details of the slicing machine do not form part of the present invention. However I illustrate my meat end plate as applied to a carriage upon which are mounted the meat supporting plane faced members $C^{11}$ and $C^{12}$ set at an angle to each other. They are separated at their inner edges by the space wherein or beneath which lies the guide rod $C^9$. Along this rod the meat end plate proper travels, its edges conforming generally to the faces of the two members $C^{11}$ and $C^{12}$. It will be noted that the meat end plate is rotatable about the rod $C^9$, which is circular in cross section but that throughout the major part of its excursion is held against relative rotation by its engagement with the members $C^{11}$ and $C^{12}$. However $C^{12}$ stops short of the end of the rod $C^9$ and when the meat end plate, on its rearward excursion has cleared the member $C^{12}$, it may be rotated into alignment with the end of the member $C^{12}$, which then serves as a stop to prevent forward movement of the meat end plate.

The propulsive impulse for the meat end plate is provided with any suitable yielding member, for example the tension spring $E^4$. In order to provide as even a thrust as possible I prefer to gear up the connection between the spring and the meat end plate, so that there will be a minimum change in tension upon the spring and a corresponding minimum change in the thrust upon the plate, as the end plate moves from one end of the trough or carriage to the other. I have effected this result by so proportioning the diameters of the pulleys $E^1$ and $E^2$ to each other and to the length of the spring $E^4$ that a negligible change in the length and tension of the spring $E^4$ takes place during the entire operative excursion of the meat end plate from the outer to the inner end of the rod $C^9$. The spring $E^4$ of course is made of sufficient strength easily to actuate the meat end plate, and the result is an even uniform thrust of the end plate and meat against the gauge plate B and toward the knife $B^2$. Where in the claims, I employ the term "means for equalizing the resultant impulse," or its equivalent, I wish the claim to be understood as calling for means for so reducing the difference in thrust of the meat against the plate at the beginning and the end of the excursion, as to render its effect on the thickness of the slice substantially nil. This obviates the tendency of unevenness in the slicing which occurs when a bearing thrust is directed against the gauge plate, since in operative differences with the ordinary slicing machine the gauge plate to some degree responds to differences in pressure and differences in thickness of slice result.

I claim:

1. The combination with a slicing machine, of a carriage and a pusher plate mounted for movement therealong, yielding means tending normally to move said pusher plate along said carriage, and means interposed between the plate and said yielding means, for equalizing the resultant impulse.

2. The combination with a slicing machine, of a carriage and a pusher plate mounted for movement therealong, yielding means tending normally to move said pusher plate along said carriage, and means for equalizing the resultant impulse, comprising a differential element between said yielding means and the pusher plate.

3. The combination with a slicing machine, of a carriage and a pusher plate mounted for movement therealong, yielding means tending normally to move said pusher plate along said carriage, and means for equalizing the resultant impulse, said yielding means and equalizing means therefor including a plurality of sheaves held against relative rotation, a flexible driving element secured to one of said sheaves and to the meat end plate, a flexible driving member secured to the other of said sheaves, and yielding means adapted to apply tension to said second flexible driving member.

4. The combination with a slicing machine, of a carriage and a pusher plate mounted for movement therealong, yielding means tending normally to move said pusher plate along said carriage, and means for equalizing the resultant impulse, said yielding means and equalizing means therefor including a plurality of sheaves held against relative rotation, a flexible driving element secured to one of said sheaves and to the meat end plate, a flexible driving member secured to the other of said sheaves, and yielding means adapted to apply tension to said second flexible driving member, including a tension spring.

5. The combination with a slicing machine, of a carriage and a pusher plate mounted for movement therealong, yielding means tending normally to move said pusher plate along said carriage, means for equalizing the resultant impulse, said yielding means and equalizing means therefor including a flexible driving means, a differential element inserted in said driving means, and yielding means adapted to apply tension to said flexible driving means.

6. The combination with a slicing machine, of a carriage and a pusher plate mounted for movement therealong, yielding means tending normally to move said pusher plate along said carriage, means for equalizing the resultant impulse, said yielding means and equalizing means therefor including a plurality of sheaves mounted for rotation upon said carriage and held against relative rotation, said sheaves being of unequal diameter, a flexible connection between the larger of said sheaves and the pusher plate, a flexible driving member secured to the larger of said sheaves and yielding means adapted to apply tension to said flexible driving member.

7. The combination with a work supporting carriage for a slicing machine, including a plurality of relatively extended plane surfaced supporting members, of a pusher plate axially movable therealong, the edges of the pusher plate conforming generally to the faces of said members, a guide rod along which said pusher plate is axially movable, and about which it is rotatable, one of said supporting members terminating short of the other, to permit rotation of the pusher plate into alignment therewith.

8. The combination with a work supporting carriage for a slicing machine, including a plurality of relatively extended plane surfaced supporting members, of a pusher plate axially movable therealong, the edges of the pusher plate conforming generally to the faces of said members, a guide rod along which said pusher plate is axially movable, said pusher plate being rotatable about said guide rod, at the outer end of its excursion, and means for holding it against such rotation throughout a substantial proportion of the length of such rod.

9. In a slicing machine having a rotary knife, a work supporting carriage and means for moving it across the face of said knife, a pusher plate mounted upon said carriage for movement thereon toward the plane of said knife and guiding means therefor including a track secured at each end to the work supporting carriage, said pusher plate being rotatable in relation to said track, and means, operative at the outward limit of its movement, for holding said pusher plate against feeding movement, including a stop member located out of the line of normal longitudinal movement of the pusher plate.

10. In a slicing machine having a rotary knife, a work supporting carriage and means for moving it across the face of said knife, a pusher plate mounted upon said carriage for movement thereon toward the plane of the knife, and guiding means therefor including a track mounted on the work supporting carriage, said pusher plate being rotatable in relation to said track, said carriage including a plurality of plane surfaced side elements, said pusher plate conforming generally to the surfaces of said elements and being normally held thereby against rotation about said track, one of said elements terminating short of the other and being adapted to serve as a stop member to prevent forward movement of the pusher plate when the pusher plate is rotated about the track and into alignment therewith.

Signed at Chicago county of Cook and State of Illinois, this 19th day of May, 1926.

WALLACE B. WOLFF.